July 3, 1962  T. EDER  3,042,204
PROCESS AND APPARATUS FOR SEPARATING GRANULAR
SOLIDS INTO TWO OR MORE END FRACTIONS
Filed April 2, 1958  4 Sheets-Sheet 3
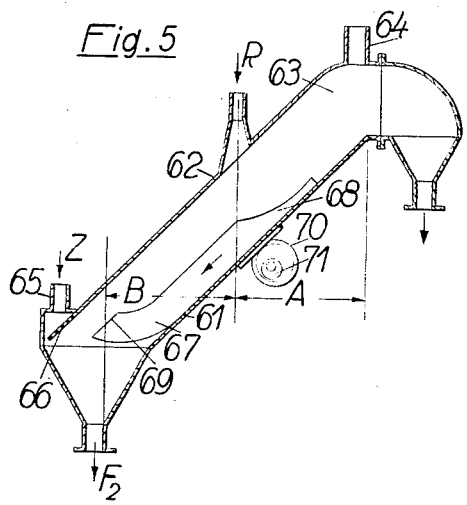
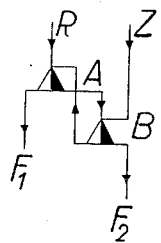
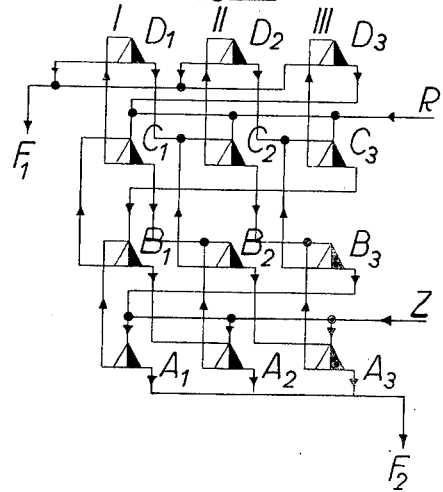

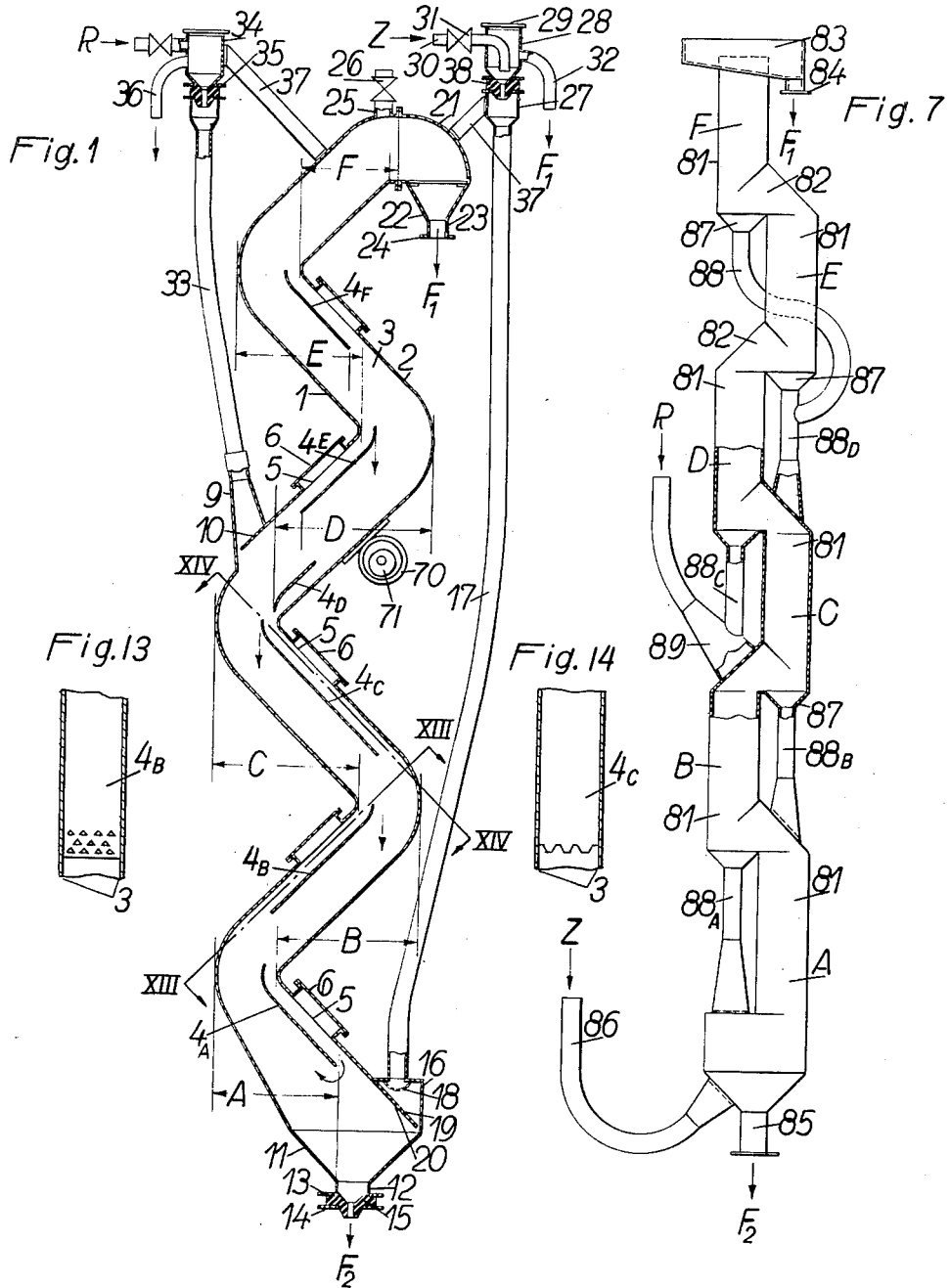

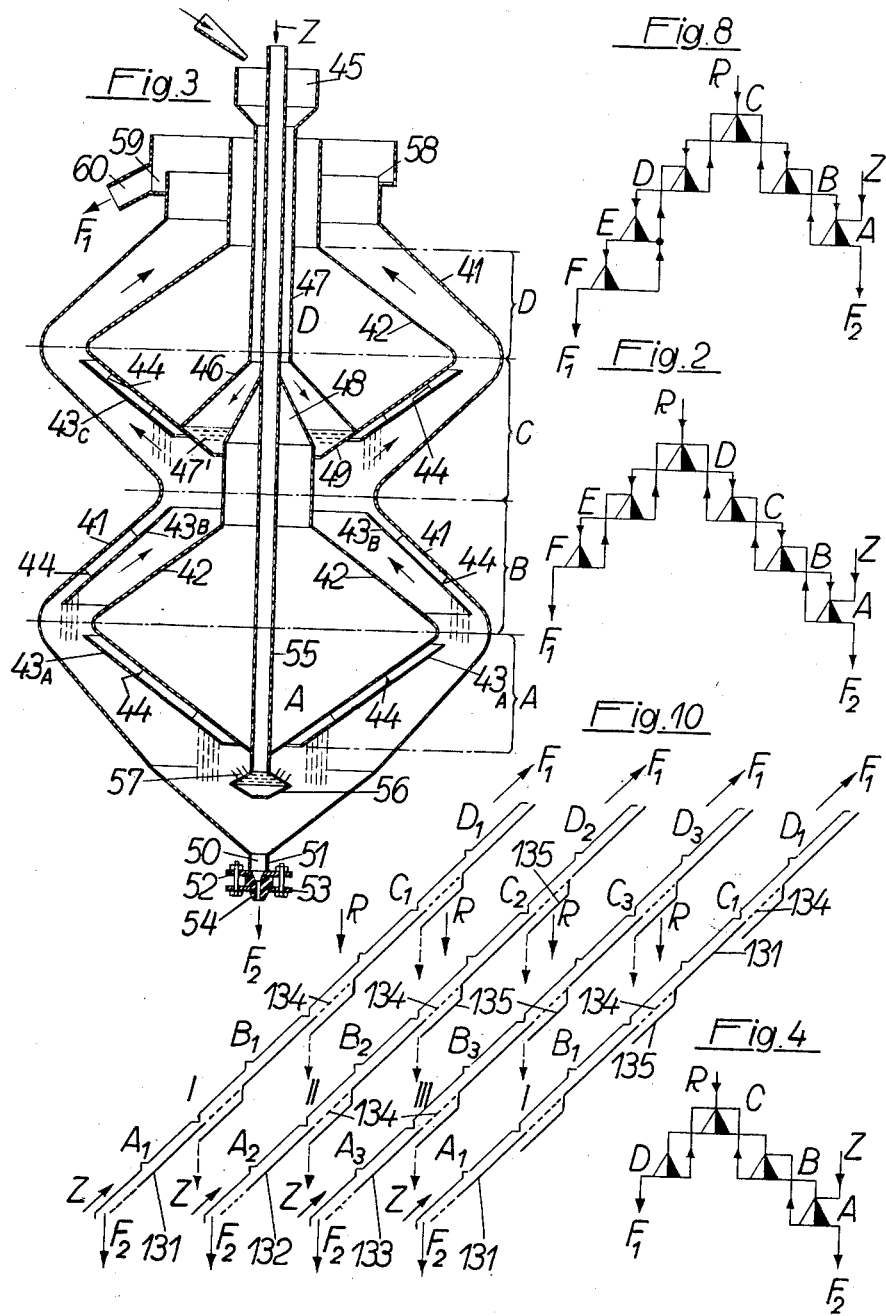

Fig.11
Fig.12
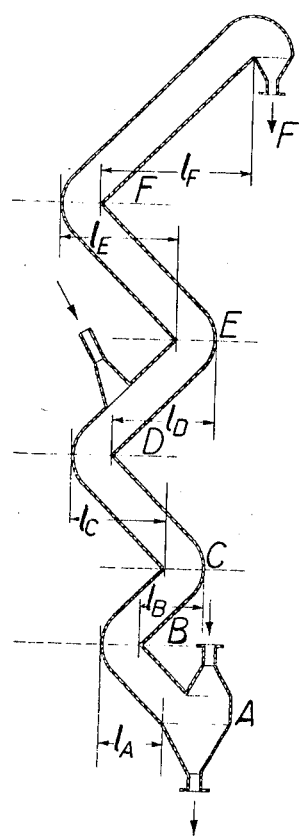
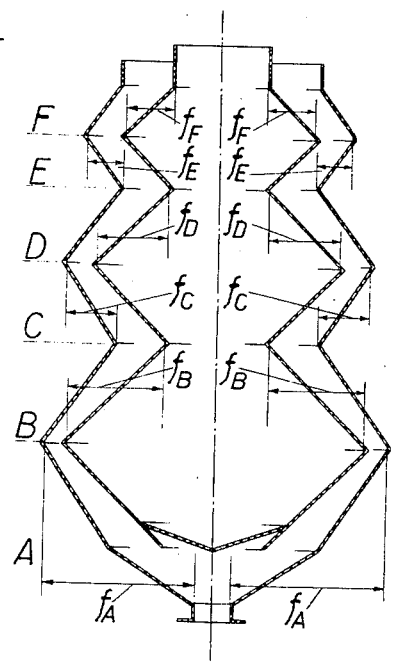

United States Patent Office 3,042,204
Patented July 3, 1962

3,042,204
PROCESS AND APPARATUS FOR SEPARATING GRANULAR SOLIDS INTO TWO OR MORE END FRACTIONS
Theodor Eder, Reisnerstrasse 32, Vienna III, Austria
Filed Apr. 2, 1958, Ser. No. 725,846
Claims priority, application Austria Apr. 3, 1957
22 Claims. (Cl. 209—157)

This invention relates to a process and apparatus for separating granular solids into two or more end fractions, in which process the granular solids are fed into an upcurrent of fluid and are separated therein by the action of gravity into fractions in dependence on the velocity of fall of the individual grains, at least two of said fractions being withdrawn as end fractions whereas the other fractions are returned to the separating process.

It is known to introduce a granular feed on an intermediate level into a vertical upcurrent of liquid and to withdraw the fines, which rise with the fluid, at the top and to withdraw the subsided coarses at the bottom (vertical hydraulic classification).

To obtain satisfactory separation with such separating process a total of 5–7 cubic meters of water per ton of feed are required, in the separation of sand. Any further increase in the concentration in the hydraulic classification vessel will reduce the precision of separation because the subsiding grains can no longer fight their way to the bottom against the upcurrent of fluid.

There has been a long-standing requirement in practice for a process of separating granular solids which enables precise separation and ensures a reliable performance of the separation with the highest possible independence from the continuity of the supply of the feed and with a high concentration of solids. Moreover, this process must have a correspondingly low consumption of fluid.

The proposed process fulfils these requirements by collecting, according to the invention, grain fractions which subside in successive, substantially laminar flow sections of one current, which sections are effective as separating currents of separate separating stages, and which transfers by gravity the grain fraction which has subsided in at least one of these flow sections to a lower flow section and distributing said grain fraction over at least part of the cross-section thereof, and withdrawing in an end stage as an end fraction the grains entrained by the current and withdrawing the grain fractions which have subsided in each of the flow sections at least that which has subsided in the other end stage as another end fraction. The subsided fractions which are not usable as an end fraction or not desirable are returned to remain in the process as a whole until they have attained the requisite quality of an end product.

Depending on the requirements regarding the precision of separation and in view of the gradation of the feed the fractions to be reintroduced may be reintroduced into the separating stage immediately preceding the delivering separating stage or into a separating stage which lies before said immediately preceding stage. A particularly convenient mode of carrying out the process according to the invention will be obtained if an upcurrent is diverted at least once and a grain fraction is caused to subside from the flow section which immediately follows the point of diversion in the direction of flow and is reintroduced into the separating process in a lower separating stage at a point spaced from the point of diversion. The transfer of grain fractions may be effected in secondary passages which extend from the delivering separating stage and bypass one or more lower separating stages, said secondary passages discharging into the flow passage.

An apparatus which is suitable for carrying out this process comprises at least one inclined or vertical flow passage, which is provided with a feed inlet and is divided into two or more sections which act as separating stages and have collecting surfaces for subsiding grain fractions. The collecting surfaces are inclined with respect to the horizontal, and further provided is means for transferring the subsided fraction of at least one such separating stage to a lower separating stage. The top end of said flow passage is formed as an outlet for an entrained end fraction, and at the lower end of said flow passage there is formed an outlet for subsided end fractions.

The purpose for which the apparatus is intended will determine the critical grain size of the apparatus and, in accordance therewith, the grain sizes of the subsiding grain fractions. The output rate of the latter fractions determines the fluid requirement. The subsided fractions to be transferred will determine the cross-sections of the secondary passages. The grain size and shape of the settled matter will determine the requisite angle of inclination of the secondary passages and of the settling surfaces with respect to the horizontal.

The invention will be explained more fully hereinafter with reference to illustrative embodiments and to the accompanying drawings, in which:

FIG. 1 is a diagrammatic sectional view showing a hydraulic classifier comprising six separating stages, and FIG. 2 shows the appertaining flow diagram.

FIGS. 3 and 4 show a radially symmetric design of a hydraulic classifier together with the appertaining flow diagram.

FIG. 5 is a diagrammatic sectional view of a two-stage hydraulic classifier,

FIG. 6 shows the appertaining flow diagram of the classifier according to FIG. 5.

FIG. 7 is a diagrammatic view of another embodiment of a hydraulic classifier,

FIG. 8 shows the appertaining flow diagram of the classifier according to FIG. 7, FIGS. 9 and 10 show the flow diagram and a diagrammatic representation of a cyclic apparatus, FIGS. 11 and 12 show hydraulic classifier vessels generally corresponding to those of FIGS. 1 and 3, respectively, but having sedimentation surfaces of varying horizontal projections, and FIGS. 13 and 14 show sections along the lines XIII—XIII and XIV—XIV in FIG. 1 respectively.

FIG. 1 shows a six-stage hydraulic classifier for separating granular solids R into two end fractions $F_1$ and $F_2$ by an undivided liquid current. Two walls 1 and 2 which are bent in zig-zag configuration with appropriate rounded portions together with two side walls 3 define a rising flow passage of rectangular cross-section. This flow passage comprises six sections A, B, C, D, E, F, which are effective as separating stages. Partitions generally designated 4 and further referenced as 4A, 4B, 4C, 4D and 4E are arranged in this passage to branch off near the transition between any two sections, such as partion 4F between sections E, F; between sections D, E, a secondary passage is arranged which extends over a certain length of the sections E and D, respectively, and is confined by one of the partitions 4E and by the walls 3 and 1 or 2. These secondary passages are accessible from the outside through openings 5, which can be tightly closed with covers 6, which may be forced against an intervening gasket, by means of a clamp. Close to the transition between the sections C and D the wall 1 is provided with an inlet pipe 9 which widens toward the flow passage and which accommodates before the inlet opening a hole plate 10, which covers the inlet opening except for a narrow slot at the lower edge. The lowermost section A has at its end an outlet 11, which tapers toward a pipe 12, which is provided with a flange 13 and to the opening of which a replaceable outlet nozzle 15 is attached with the aid of a counterflange 14. The nozzles consist preferably of wear-resisting material such as rubber or plastic. The end of section A supports a washing liquid inlet consisting of a roof-shaped extension 16 which is mounted on the wall 2 and provided with a supply pipe 17. A cylindrical hole plate 18 is disposed before the discharge opening of the supply pipe 17. Two additional hole plates 19 and 20 extending substantially in the plane of the wall 2 are inserted before the opening which connects the roof-shaped extension 16 to the flow passage.

An elbow 21 connected to the top end of the last section F of the flow passage carries a funnel-shaped tapered outlet 22 having a pipe 23 with a flange 24 for discharging an overflowing end fraction. A vent pipe 25, which can be closed by a valve 26, is provided at the uppermost point of the flow passage. The flaring top end 27 of the supply pipe 17 leading to the rooflike extension 16 is connected to the base of a metering device, which consists of a vessel 28, which has a cover 29 and a feed pipe 30 incorporating a valve 31. A drain pipe 32 extends from the vessel 28. A replaceable nozzle 38 consisting preferably of rubber, plastic or the like is disposed between the flaring end 27 of the pipe 17 and the base of the vessel 28.

A pipe 33 leads from the inlet 9 to an inlet device 34 for the feed suspension, which inlet device is provided with a drain pipe 36 and incorporates a nozzle 35. In many cases the drain pipe may be omitted. Where such a vessel is provided, as in the illustrated apparatus, this vessel as well as the metering device must be affixed above the uppermost point of the flow passage and preferably to the same frame (not shown) which supports the flow passage. This is indicated in FIG. 1 by the two supports 37.

The apparatus described has the following mode of operation:

Of the feed suspension flowing to the inlet vessel 34 a portion which is determined by the cross-section of the nozzle 35 passes through the pipe 33 into the inlet 9 and enters from there into the flow passage, in which an upcurrent of liquid is provided by an appropriate supply of washing liquid Z, the rate of which is determined by nozzle 38. The hole plate 10 disintegrates any bunched solids in the raw feed entering the inlet 9 and distributes the solids supplied more evenly over the entire inlet cross-section. The feed suspension enters the flow passage at a low velocity and is admixed therein with the rising liquid. This leaves laminar flow conditions substantially unaffected. Individual grains which are too large to pass through the holes in the inclined plate 10 slide along the same and fall through the described slot also into the flow passage. The several flow sections D, E, F in which the flow is at least substantially laminar, act as separating currents and constitute separate separating stages combined in a chain of separate stages and separating the feed solids into fractions since grains having a velocity of fall which exceeds the vertical component of the velocity of the upstreaming fluid will subside and will reach as a subsiding fraction the inclined portions of walls 2, 1, and again 2, where they slide downwardly. It will be appreciated that the inclination of these wall sections with respect to the horizontl must be sufficient to permit such a sliding movement, which may be assisted by a vibratory movement imparted to the walls. The grains having a velocity of fall which is less than the velocity of the upstreaming fluid are entrained as rising fractions by the fluid. The last of these rising fractions, $F_1$, emerges as an end fraction from the end outlet 22. The individual fraction which has subsided in the section F and has descended along the wall 2 reaches the partition 4F of the preceding section E. The "inlet" of this separating stage is now supplied with the subsided individual fraction which slides down from the partition, whereby said fraction is reintroduced into the separating process. The fractions are similarly handled in the other separating stage sections of the flow passage. The secondary passages in which the fractions to be reintroduced are conducted and their openings which discharge into the respective sections of the flow passage may be designed and arranged to provide for a substantially uniform distribution of these fractions over the cross-sections of the respective separating currents at the points of discharge. For instance, the edge of the bottom of the secondary conduit may be serrated as is indicated in FIG. 14 with respect to partition 4C, or the bottom of the secondary conduit may be apertured close to the point of discharge as shown in FIG. 13 with respect to the partition 4B, both of these partitions being shown in FIG. 1. The fraction which subsides in the lowermost section A is withdrawn as the second end fraction $F_2$ by the outlet nozzle 15 of appropriate cross-section.

The flow diagram of the described apparatus is shown in FIG. 2. In this flow diagram the separating stages are represented by triangles, the areas of which are partly hatched to indicate the separation into two fractions. The top corner of the triangle indicates the inlet and each of the other two corners indicates the outlet for the respective fraction. Each separating stage supplies a rising fraction and a subsiding one. The subsided fraction of stage A and the overflowing fraction of stage F are withdrawn as end fractions $F_2$ and $F_1$, respectively, whereas the other fractions are recycled into the separating process.

Apparatus according to the invention may be provided with a flow passage of annular cross-section, which is confined by outer and inner shells, at least one of which has a portion arranged as a collecting surface for a subsided fraction. Such an embodiment is shown in FIG. 3. It comprises a flow passage of annular cross-section, which is defined by an outer shell 41 and an inner shell 42. Both shells are formed as surfaces of revolution having a wavy generatrix which comprises straight sections. This flow passage comprises four sections A, B, C, D, which extend substantially between planes extending at right angles to the axis of revolution through the crests and troughs of the generatrices. Partitions 43 forming conical surfaces and held by webs 44 are provided in sections A, B, C and together with the adjacent portion of the inner or outer shell define a secondary passage which is separate from the flow passage and much smaller in cross-section than the latter. A feed inlet provided close to the transition from the section B to the section C consists of a conically downwardly flaring shell 46, to the top of which a centrally disposed pipe 47 is attached. Pipe 47 is connected to an inlet funnel 45. A distributing member 48 is accommodated in the cavity defined by the conical shell 46. The conical shell 46 and the distributing member 48 are supported by the inner shell 42 and communicate with the flow passage through an annular slot 47', which is at least partly covered preferably by a sieve plate 49. An outlet 50 comprising a pipe 51 and flange 52 is provided at the end of the lowermost section A and a replaceable outlet nozzle 54 is attached by a counterflange 53 to the flange 52. The discharge opening of an inlet device for washing liquid is also disposed at the same end of section A.

The inlet device comprises a diverting surface 56, which is disposed in the flow passage at the end of the pipe 55. The latter pipe extends through the inner shell 42 in sealed relation therewith and is connected to a conical sieve shell 57. The other end of the pipe 55 is connected to an overflow vessel not shown. An overflow for the rising end fraction is disposed at the top end of the last section D. This end fraction flows over a weir 58 into an annular passage 59 having an inclined bottom. An outlet pipe 60 is disposed at the lowermost point of the annular passage 59. In some cases, it may be desirable to impart a vibratory motion which promotes the downward sliding movement of the subsided solids to the wall on which the individual fraction subsides and/or to a wall of the flow path in which such fraction is conducted. Such a vibration may be produced, e.g., with the aid of a small electric motor 70 which may be mounted on wall 2 and the shaft of which carries two eccentric discs.

The described apparatus has the following mode of operation:

The feed passes through the annular space between the two pipes 47, 55 into the space enclosed by the shell 46 and after it has been evenly distributed by plate 49 enters the flow passage, in which an upcurrent of liquid flows, which is appropriately adusted by the selection of the rate at which washing liquid (Z) is supplied. The feed flowing at a low speed is admixed to this liquid current. The fractions which subside in the several sections (A, B, C, D) of the hydraulic classifier vessel reach those portions of the outer and inner shells which are inclined with respect to the horizontal and slide along these portions and downwardly over the edges thereof but are caught below the edges by the partitions and are conducted into the secondary passages defined by said partitions and the inner or outer shell and enter in a distribution provided by holes adjacent to the discharge openings into the effective inlet zones of preceding separating stage sections, where they are returned into the upcurrent. The paths of the individual fractions are apparent from the flow diagram shown in FIG. 4.

Whereas the apparatus just described is provided with shells constructed as surfaces of revolution it may be simpler to use outer and inner shells of polygonal cross section, especially simplicity of fabrication to use outer and inner shells of polygonal, e.g., octagonal cross-section, particularly in larger units, because in this case the shells can be constructed from appropriately cut plane metal sheets.

Such constructions of multi-stage hydraulic classifiers may be embodied in space-saving and, in some cases, self-supporting arrangements.

Another embodiment of an apparatus according to the invention in the form of a two-stage hydraulic classifier is shown in a diagrammatical sectional view in FIG. 5. Two inclined walls 61 and 62 form together with two side walls 63 a rising flow passage, which is maintained in operating position by a framework not shown. An outlet for an overflowing end fraction is attached to the top end of the flow passage and an outlet for a subsiding end fraction is attached to the lower end of the flow passage. A roof-shaped chamber is mounted on the wall 62 adjacent the latter outlet. A supply line for washing liquid discharges into said chamber 65. The washing liquid enters the flow passage in an equalized flow through an opening covered by a screen 66 or the like. The wall 62 also supports an inlet for the feed to be separated. The flow passage is functionally divided into two sections A, B. The section B contains a pipe 67, which has a fan-shaped inlet opening 68 and the outlet opening 69 of which is disposed near the inlet opening for the washing liquid. A vent pipe 64, which can be closed, is disposed at the uppermost point of the flow passage.

In some cases it may be desirable to impart a vibratory motion which promotes the downward sliding movement of the subsided solids to the wall on which an individual fraction subsides and/or to the wall of a flow path in which such fraction is conducted. Such vibration may be produced by a small electric motor 70, which may be mounted on the wall 61 and the shaft of which carries two eccentric discs 71.

A simple modification of such apparatus comprises a flow passage of triangular cross-section, one corner of which is downwardly directed. In this case the secondary passage may be obtained in a most simple manner by the insertion of a narrow partition which defines a narrow passage of triangular cross-section in the lower separating stage A.

The flow diagram of this apparatus is shown in FIG. 6. Granular solids R entering through the inlet are divided into subsiding and rising fractions while conducted through section A. The rising fraction is withdrawn as one end fraction $F_1$, whereas the subsiding fraction slides down the wall 61, is collected in the pipe 67 and is fed by this pipe to the inlet of stage B. The fraction which subsides in this separating stage reaches the wall 61 or the wall of the pipe 67, where it slides downwardly and leaves the apparatus as the second end fraction $F_2$ through the lower outlet. Units as shown in FIG. 5 may be conveniently assembled to form more complex separating plants.

FIG. 7 shows diagrammatically another illustrative embodiment of a separating apparatus according to the invention. The rising flow passage of this apparatus is composed of pipe sections 81, which in operating position have relatively staggered vertical axes and are interconnected by elbows 82 to form six separating stages A, B, C, D, E, F constituting vertical hydraulic classifiers. An overflow 83 with an outlet pipe 84 for an overflowing end fraction $F_1$ is provided at the top end of the last pipe section (stage F). An outlet 85 for a subsided end fraction $F_2$ and the discharge opening of a supply line 86 for washing liquid Z are disposed at the lower end of the first pipe section (stage A). The lower ends of the pipe sections of stages B to F carry funnel-shaped extensions 87, to which pipes 88 are attached, which form secondary passages and which bypass at least one separating stage and discharge into lower pipe sections, preferably into the elbow which connects two such sections. The secondary passage which extends from the last separating stage F bypasses the preceding separating stages E, D; the secondary passage which extends from the separating stage E bypasses the stage D. These two secondary passages are connected together to discharge into the "inlet" of stage D. The discharge openings of the secondary passages are preferably covered by hole plates, screens or the like. The feed inlet 89 is attached to the elbow which interconnects the pipe sections forming the separating stages C and D and is connected together with the secondary passage which discharges there.

The flow diagram of this apparatus is shown in FIG. 8. Each of the six pipe sections acts as a vertical hydraulic classifier and supplies subsiding and entrained grain fractions. The repeated diversion of the rising upcurrent of liquid enables the transfer of the subsided grain fractions from separating stages B, C, D, E and F into the separating current of lower separating stages. The hole plates provide for an equalized feeding and reintroduction of the granular solids and for its distribution over the cross-sections of the separating current. The subsided fraction of separating stage A and the overflowing fraction of separating stage F are withdrawn as end fractions $F_2$ and $F_1$, respectively.

According to the process of the invention and in apparatus according to the invention the individual separating stages of which the separating process is composed may also be connected in accordance with other flow diagrams, to form a simple chain of separating stages.

In order to reduce the installation cost the process according to the invention may be modified in that each of the separating stages is divided into several parallel separating stage portions and separating stage portions of successive separating stages are connected in series to form parallel component streams, the subsided fraction of each separating stage portion of at least one separating stage being transferred to a lower separating stage portion belonging to another component stream whereas the rising fractions of each component stream remain in the same. Apparatus which is suitable for carrying out this modification of the separating process comprises a vessel confining said flow passage and comprising inclined guiding and settling surfaces dividing each separating stage into separating stage portions and connecting the separating stage portions of successive separating stages to form parallel chains of separating stage portions, said guiding and settling surfaces being formed between said separating stages with openings which provide a communication between each of said separating stage portions of at least one separating stage and a lower separating stage portion belonging to another chain of separating stage portions, each of said chains of separating stage portions being provided with a feed inlet and with two end fraction outlets.

This modification of the process will be explained more fully hereinafter with reference to FIG. 9, which shows three groups I, II, III each comprising three hydraulic classifier stage portions $A_1$, $B_1$, $C_1$, $D_1$; $A_2$, $B_2$, $C_2$, $D_2$; and $A_3$, $B_3$, $C_3$, $D_3$. It is apparent from the flow diagram that the subsided individual fraction of each separating stage portion except those of the lowest stage is transferred to a separating stage portion which belongs to the next lower separating stage and to another group. The rising individual fractions remain in the groups to which the several stage portions belong. The outlets for the end fractions $F_1$ and $F_2$, the inlets for the feed R and the fresh water inlets Z are connected together.

Apparatus for carrying out a separating process according to the flow diagram of FIG. 9 may consist of a vessel which is confined by inner and outer shells and in which the annular cavity between the two shells is divided into flow channels with the aid of guiding and settling surfaces, which are preferably equal to each other and equally angularly spaced. The annular cross-section of such a device may be defined by two concentric circles or by polygons. The guiding and settling surfaces may be formed as helical surfaces although it is not necessary exactly to adhere to a geometrical form. For instance, each of these settling surfaces may be composed of a plurality of plane sheet metal members, which are assembled in a somewhat twisted shape and are held by the shells. In that case the several surfaces incorporated in the annular cavity lie one beside or above each other like the threads of a multiple screw thread to enable a very space-saving accommodation of several flow channels within a single unit and a large total settling area is obtained.

The essential features of such unit may be illustrated most simply in a diagrammatic developed view as is shown in FIG. 10. For the sake of simplicity it may be assumed that the annular cavity of the vessel is divided into three flow channels I, II, III by means of three helical guiding and settling surfaces 131, 132, 133. To emphasize the cyclical arrangement the wall 131 is shown once more next to the wall 133. Each of these three guide walls is interrupted by equally spaced screen zones 134, which divide the flow channels into sections $A_1$, $B_1$, $C_1$, $D_1$; $A_2$ to $D_2$ and $A_3$ to $D_3$. These screen zones may be replaced by slots which extend across the width of the surfaces. Such a division of the settling surfaces does not interfere with the function of the several sections of the flow passages; they remain effective as separating stage portions although the several channels are only partly rather than completely separated from each other. Baffles 135 are disposed below the screen zones to separate small portions of the flow passages I, II and III.

When the feed to be separated has a high content of grains the size of which is near the critical grain size for separation the output rate can sometimes be increased by increasing the sedimentation flow rate (the grain-containing liquid which flows per unit of time over a unit of area of the horizontal projection of the effective settling surface) throughout the entire space in which the separating process is performed in stepwise fashion in the direction of the liquid current from separating stage to separating stage. Whereas this procedure adversely affects the precision of separation this reduction is insignificant in many cases.

An apparatus designed in accordance with these considerations is illustrated in FIG. 12, which shows only the two shells which confine the flow passage and are formed in accordance with surfaces of revolution. The plan projections $f_A$, $f_B$ ... $f_F$ are selected to satisfy the relation $$f_F:f_E:f_D:f_C:f_B:f_A = 12:12:21:21:32:48$$

so that $$f_F \doteq f_E < f_D \doteq f_C < f_B < f_A$$

wherein the symbol $\doteq$ denotes an equal or nearly equal relationship between the respective quantities. On the other hand, it may be desirable in some cases to enhance the precision of separation by decreasing the specific sedimentation flow rate in the direction of flow stepwise.

An apparatus of this type is diagrammatically shown in FIG. 11. It is similar in construction and function to the apparatus shown in FIG. 1. Because the flow passage is rectangular in cross-section and uniform in width the relations of the plan projections of the settling surfaces equal the relations of the length of the plan projections of the several flow sections which form the separating stages. In the present case the surfaces are dimensioned so that $$f_F > f_E > f_D \doteq = f_C > f_B = f_A = l_F > l_E > l_D = l_C > l_B = l_A$$

In apparatus which permits of carrying out a separating process under these conditions the horizontal projection of settling surfaces over which separating currents flow is varied stepwise.

The effectiveness of the process according to the invention is apparent from the following example of separating a raw sand with an apparatus as shown in FIGS. 1 and 2. The unit had a height of 2.5 meters. The cross-section of the flow passage was 5 square decimeters. A mixture of 4 metric tons of raw sand and 3 cubic meters of water was fed per hour to the inlet and 7 cubic meters of washing water were supplied through the washing water inlet. The overflowing end fraction $F_1$ consisted of 1.1 metric tons per hour of fine sand and 7 cubic meters per hour of water. The subsided end fraction $F_2$ consisted of 2.9 metric tons per hour of coarse sand and 3 cubic meters per hour of water. The gradation (sieve analysis) of the raw sand and of the two end fractions is apparent from the following table:

| Grain Size, mm. | Raw Sand, percent | Coarse Sand, percent | Fine Sand, percent |
|---|---|---|---|
| >1 | 31 | 43 | |
| 0.6–1 | 15 | 21 | |
| 0.4–0.6 | 11 | 15 | |
| 0.25–0.4 | 10 | 14 | 0.4 |
| 0.15–0.25 | 9 | 6 | 16.6 |
| 0.1–0.15 | 6 | 1 | 19 |
| 0.06–0.1 | 7 | traces | 25 |
| 0.04–0.06 | 4 | traces | 15 |
| <0.04 | 7 | traces | 24 |

72% of the charged raw sand were discharged as coarse sand and 28% as fine sand. The critical grain size of the unit was near 0.2 mm.

This example shows clearly that a much higher precision of separation than with conventional vertical hydraulic classifiers is obtained although the total consumption of water is reduced by more than half (to 2–3 cubic meters per hour and per metric ton of feed).

I claim:

1. A method of classifying a mixture of loose solid particles of different sizes by gravity, which comprises feeding fluid into a confined flow passage to maintain therein a fluid upcurrent comprising at least two superimposed and series-connected flow sections having substantially laminar flow characteristics, introducing said mixture into said flow passage above the lowermost of said flow sections which is fed with said fluid, each of said flow sections being adapted to act as a separating stage and having a predetermined velocity of flow to cause a greater part of the particles below a predetermined size to be entrained by said upcurrent in said flow section and to cause a greater part of the particles of said mixture exceeding said predetermined size to subside against said upcurrent in said flow section, collecting the particles which have subsided in at least one of said flow sections, except the lowermost one, transferring said collected particles outside said fluid upcurrent in the flow passage and dropping said transferred particles into the upcurrent at a point below a major part of the length of a lower one of said flow sections, withdrawing the fluid together with the entrained particles as one end fraction in the top of the uppermost of these flow sections, and withdrawing particles which have subsided in the lowermost of said flow sections as another end fraction from said lowermost flow section.

2. A process as set forth in claim 1, in which each of said flow sections is divided into several parallel separating stage portions and separating stage portions of successive separating stages are connected in series to form parallel component streams, the subsided fraction of each separating stage portion of at least one separating stage being transferred to a lower separating stage portion belonging to another component stream whereas the rising fractions of each component stream remain in the same.

3. A method of classifying a mixture of loose solid particles of different sizes by gravity, which comprises maintaining in a confined flow passage a fluid upcurrent comprising at least two superimposed and series-connected flow sections having substantially laminar flow characteristics, said upcurrent having a bend between two adjacent ones of said flow sections, introducing said mixture into said flow passage above the lowermost of said flow sections, each of said flow sections being adapted to act as a separating stage and having a predetermined velocity of flow to cause a greater part of the particles of said mixture below a predetermined size to be entrained by said upcurrent in said flow section and to cause a greater part of the particles of said mixture exceeding said predetermined size to subside against said upcurrent in said flow section, collecting the particles which have subsided in the flow section immediately above said bend, transferring said collected particles in a by-pass to the upcurrent streaming in the flow passage by gravity and dropping said transferred particles into the streaming upcurrent at a point below a major part of the length of the next lower flow section, withdrawing particles entrained in the uppermost of said flow sections together with entraining fluid as one end fraction from the top of said uppermost flow section, and withdrawing particles which have subsided in the lowermost of said flow sections as another end fraction from said lowermost flow section.

4. A process as set forth in claim 1, in which the specific sedimentation flow rate is decreased at least in steps in the direction of flow to increase the precision of separation.

5. A process as set forth in claim 1, in which a vibratory motion is imparted to a confining wall of at least one of said flow sections, except the lowermost one.

6. Apparatus for classifying granular material consisting of particles of different sizes by gravity which comprises means defining a flow passage for a fluid upcurrent, said flow passage comprising at least two superimposed and series-connected flow sections adapted to conduct said upcurrent under substantially laminar flow conditions to form separating stages having a predetermined velocity of flow, a feed inlet connected to said flow passage above the lowermost of said flow sections to feed said mixture to said flow passage, said means defining said flow passage comprising adjacent to each of said flow sections a collecting surface which is inclined with respect to the horizontal and exposed to said flow section and arranged to collect particles subsiding in said flow section, at least one secondary conduit, by passing substantially at least one section of the flow passage, said secondary conduit being arranged to transfer solids from the collecting surface adjacent to at least one of said flow sections, except the lowermost one, under the action of gravity and to drop them into said passage at a point below a major part of the length of the next lower flow section, a fluid inlet at the lower end of the passage, and end fraction outlets at the upper and lower ends of said flow passage.

7. Apparatus as set forth in claim 6, in which said means defining said flow passage are constructed to define at least two of said flow sections each having different areas in horizontal projection increasing in the direction of flow.

8. Apparatus as set forth in claim 6, which comprises means defining a second flow passage for a fluid upcurrent, said second flow passage being connected in parallel to the first-mentioned flow passage and comprising also at least two of said superimposed and series-connected flow sections and having said feed inlet also connected thereto, and means arranged to transfer solids from the collecting surface adjacent to at least one of said flow sections, except the lowermost one, of said second passage, under the action of gravity outside said flow passages and to drop them into said second flow passage at a point below a major part of the length of the next lower flow section of said second flow passage, and in which said end fraction outlets are connected to the upper and lower ends of said second flow passage.

9. Apparatus as set forth in claim 6, in which flow sections of said flow passage are arranged in zig-zag configuration.

10. Apparatus as set forth in claim 6, in which said means defining said flow passage comprise inner and outer shells defining a flow passage, at least one of said shells being formed with collecting surfaces.

11. Apparatus as set forth in claim 10, in which at least one of said shells has a polygonal cross-sectional shape.

12. Apparatus as set forth in claim 10, in which said shells form mutually coaxial surfaces of revolution, at least one of which has a wave-shaped meridian.

13. Apparatus as set forth in claim 6, in which said flow sections form vertical hydraulic classifiers.

14. Apparatus as set forth in claim 6, in which the horizontal projections of said flow sections vary at least in steps in the direction of flow.

15. Apparatus as set forth in claim 6, which comprises a vibrator operatively connected to said means defining said flow passage.

16. Apparatus as set forth in claim 6, which comprises a vibrator operatively connected to said collecting surface.

17. Apparatus as set forth in claim 6, in which said means defining said flow passage define at least three of said superimposed and series-connected flow sections of said flow passage and said feed inlet is connected to the intermediate one of said flow sections and said means arranged to transfer solids from the collecting surface adjacent to at least one of said flow sections, except the lowermost one, and to drop them into said passage at a point below a major part of the length of the next lower flow section comprise at least one secondary conduit branched off said passage at the lower end of at least one of said collecting surfaces, except those adjacent to the two lowermost flow sections, and having a discharge opening connected to said flow passage at a point below the next lower flow section.

18. Apparatus as set forth in claim 6, in which at least one of said secondary conduits extends inside said means defining said flow passage.

19. Apparatus as set forth in claim 6, in which at least one of said secondary conduits is at least partly formed by said means defining said flow passage.

20. Apparatus as set forth in claim 6, in which said secondary conduit has a plurality of closely spaced discharge openings distributed over the cross-section of said flow passage.

21. Apparatus as set forth in claim 6, in which said discharge opening of said secondary conduit has a jagged rim.

22. Apparatus as set forth in claim 6, which comprises a vibrator operatively connected to said secondary conduit.

References Cited in the file of this patent

UNITED STATES PATENTS

| 1,332,751 | Polo | Mar. 2, 1920 |
| 2,426,839 | Morris | Sept. 2, 1947 |

FOREIGN PATENTS

| 24,968 | Great Britain | 1907 |